Dec. 13, 1927.
A. C. T. ISAAC
1,652,941
FLUID FLOW INDICATOR
Filed Oct. 12, 1925
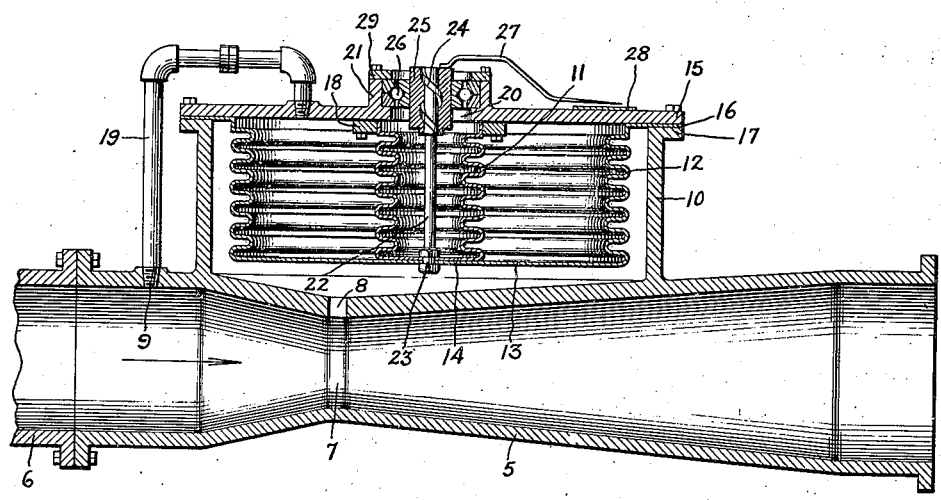
Inventor:
Archibald C.T. Isaac;
His Attorney.

Patented Dec. 13, 1927.

1,652,941

UNITED STATES PATENT OFFICE.

ARCHIBALD C. T. ISAAC, OF PITTSFIELD, MASSACHUSETTS, ASSIGNOR TO GENERAL ELECTRIC COMPANY, A CORPORATION OF NEW YORK.

FLUID-FLOW INDICATOR.

Application filed October 12, 1925. Serial No. 62,175.

The present invention relates to fluid-flow indicators and has for its object the provision of an improved indicator of that class which is of simple, compact structure and which employs a minimum of working parts.

A flow indicator embodying the invention and intended primarily as a water flow indicator for use in transformer water cooling systems is shown by way of example in the figure in the accompanying drawing, and for a consideration of what is believed to be novel and the invention, attention is now directed to said drawing, the description thereof and the appended claims.

Referring to the drawing, 5 is a Venturi tube through which water flows from a conduit 6 in the direction of the arrow. The tube is provided with the usual Venturi throat 7 and low and high pressure metering ports 8 and 9 respectively. Port 8 communicates with the interior of a short cylindrical meter casing 10 mounted on the Venturi tube. In the present example the casing is cast integral with the tube on one side thereof. The casing encloses a pair of expansible, cylindrical metal bellows 11 and 12 arranged substantially concentrically with respect to each other and the casing to resiliently support a movable abutment in the form of a cylindrical diaphragm 13 positioned adjacent the inner end of the casing concentrically therewith. The diaphragm in the present example is integral with the outer bellows 12 forming a bottom wall therefor, and is connected with the adjacent end of the inner bellows through a similar bottom wall 14, with which the latter is provided, soldered or otherwise suitably secured thereto.

The opposite ends of the bellows join a tight fitting cover 15 for the casing, the outer bellows 12 being provided with a flange 16 which is secured between a flanged end 17 of the casing and the cover, and the inner bellows 11 being secured to the cover in a similar manner by a clamping ring 18 bolted to the inner face of said cover. The joints between the cover, casing and bellows are made pressure tight by any suitable method or means, such as soldering, for example, so that the interior of the casing and of the outer bellows are hermetically sealed and separated from each other by the diaphragm 13 and the wall of bellows 12.

The casing is also in communication with the high pressure metering port 9 through a pressure conduit 19 leading from said port to the cover end of the casing and the interior of the outer bellows 12. With the interior of the casing directly connected with pressure port 8 as hereinbefore stated, diaphragm 13 is thus subjected to the metering pressure from port 8 on one side, the lower side in the present example, and to the metering pressure from port 9 on the other side, the upper side in the present example, and moves in response to the pressure differences set up by the flow in the Venturi tube. Viewed in another aspect, the outer bellows and the diaphragm may be considered as providing a wall which divides the casing into two separate or independent compartments, each of which is in communication with a separate metering port.

With the flow as indicated, in the direction of the arrow, a greater pressure exists at port 9 and above the diaphragm than at port 8 and below the diaphragm, with the result that the diaphragm moves downwardly to extend the double bellows arrangement until the latter is stressed sufficiently to hold the diaphragm in equilibrium. As the difference in pressure between ports 8 and 9 changes with changes in flow, according to the well known operation of a Venturi tube, the diaphragm moves to a new point of equilibrium either upwardly or downwardly in response thereto, thereby indicating the change in flow.

The range of movement or travel of the diaphragm is determined by the strength of bellows 11 and 12 and the size of the Venturi throat 7, and is preferably short so that the bellows and casing may be made short and compact. It will be seen that with a given diaphragm and bellows, the range of travel of the former may be kept within the desired limits for any range of flow in the Venturi tube, by the proper choice of the throat size.

The interior of the inner bellows 11 is open to the atmosphere through a central opening 20 in the cover and a bearing housing 21 surrounding said opening integral with the cover. The inner bellows forms a well beneath the bearing housing through which extends a rod 22 connected at its lower end with the diaphragm center as indicated at 23, and provided with a sharply pitched screw 24 at its upper end. The screw lies within the bearing housing and operates within a similarly threaded cylindrical nut 25 to rotate the latter in response to movement of the diaphragm. The nut rotates in a bearing, such as ball bearing 26, fitted into the housing 21 and is connected with a suitable indicating means for indicating the position and movement of the diaphragm as an indication of the flow.

In the present example the nut carries a pointer 27 as an indicating means and the pointer is arranged to swing over a scale 28 secured to the casing cover. A full scale deflection of the pointer is permitted by providing the proper thread pitch in the screw and nut arrangement. The nut is prevented from axial movement by being tightly fitted in the inner ring of the ball bearing and the bearing is retained in the housing by a retaining cap 29.

The construction shown provides a compact indicator of few parts, and one which comprises no rubber packings, gaskets or the like to cause leakage or sticking of moving parts. It is extremely reliable in operation and the simple construction renders it low in manufacturing cost. The Venturi tube and meter casing are made in one simple casting and provide a rugged meter or indicator body within which all operating parts are safely enclosed. Because of its compact, rugged construction and reliability, the indicator of the present invention is well adapted for mounting in the cooling water conduits of transformers and the like for directly indicating the cooling water flow.

To maintain the indicator in operation, no attention is required other than an occasional oiling of the screw 24 and bearing 26 which are conveniently located for this purpose.

What I claim as new and desire to secure by Letters Patent of the United States is:

1. In a flow indicator, the combination with a Venturi tube, of a meter casing integral therewith, a movable diaphragm within the casing, an expansible bellows connecting the diaphragm with one end of the casing, said bellows and diaphragm dividing the casing interior into two independent compartments, means for supplying pressures from the Venturi tube to said compartments, and indicating means connected with the diaphragm.

2. In a flow indicator, the combination with a Venturi tube having a high and a low pressure metering port in a side wall thereof, of a meter casing mounted on said side wall in communication at one end with one of said ports, a conduit connecting the opposite end of the casing with the other port, a movable abutment in the casing between the ends thereof, means connecting the abutment and the casing to provide a dividing wall between the ends of the casing whereby the abutment is responsive to the pressure supplied to the casing from said ports, and indicating means responsive to movement of the abutment connected therwith.

3. A flow indicator having a body comprising a Venturi tube and a casing integral with a wall thereof, a pair of metering pressure ports in said wall connected with the interior of the casing at opposite ends thereof, a movable abutment in the casing between said ends, a pair of concentric cylindrical bellows connecting said abutment with one end of the casing, the outer bellows and the abutment serving to divide the casing interior into two independent compartments, each of which is in communication with a separate pressure port, whereby the movable abutment is actuated in response to the pressures supplied by the pressure ports, and indicating means connected with the abutment to be moved thereby.

4. In a flow indicator, the combination with a Venturi tube, of a meter casing integral therewith, a pair of expansible bellows within the casing arranged one within the other, a movable diaphragm within the casing, each of said bellows being connected at one end with the casing and at the opposite end with the diaphragm, whereby the latter is yieldably supported with respect to the casing by the bellows, conduit means connecting the Venturi tube with the casing to supply metering pressure from said tube to the casing on opposite sides of the diaphragm, whereby the diaphragm is moved in response to pressure changes, and indicating means carried by the casing and connected with the diaphragm.

5. In a flow indicator, the combination with a Venturi tube having a Venturi throat, of a meter casing integral therewith, a pair of expansible bellows within the casing arranged one within the other, a movable diaphragm within the casing, each of said bellows being connected at one end with the casing and at the opposite end with the diaphragm, whereby the latter is yieldably supported with respect to the casing by the bellows, a low pressure metering port in the wall of the Venturi tube connecting the throat thereof with the interior of the casing, a high pressure metering port in the wall of the Venturi tube connected with the interior of the outer bellows, a rod which passes through the interior of the inner bellows connected at one end with the diaphragm to be moved thereby, and indicating means actuated by movement of the rod connected with the opposite end thereof.

6. In a flow indicator, the combination with a Venturi tube having a Venturi throat, of a meter casing integral therewith, a pair of expansible cylindrical bellows within the casing arranged substantially concentrically with each other one within the other, a movable diaphragm within the casing, each of said bellows being connected at one end with the casing and at the opposite end with the diaphragm, whereby the latter is yieldably supported with respect to the casing by the bellows, a low pressure metering port in the wall of the Venturi tube connecting the throat thereof with the interior of the casing, a high pressure metering port in the wall of the Venturi tube connected with the interior of the outer bellows, a rod which passes through the interior of the inner bellows connected at one end with the diaphragm to be moved thereby, a screw carried by the opposite end of said rod, a nut into which said screw is threaded, a bearing for the nut, and indicating means connected with the nut.

In witness whereof, I have hereunto set my hand this 8th day of October, 1925.

ARCHIBALD C. T. ISAAC.